(12) United States Patent
Laimböck

(10) Patent No.: US 6,257,178 B1
(45) Date of Patent: Jul. 10, 2001

(54) INTERNAL COMBUSTION ENGINE FOR A MOTORCYCLE

(75) Inventor: Franz Laimböck, Thal (AT)

(73) Assignee: Avl List GmbH, Graz (AT)

( * ) Notice: Subject to any disclaimer, the term of this patent is extended or adjusted under 35 U.S.C. 154(b) by 0 days.

(21) Appl. No.: 09/648,809

(22) Filed: Aug. 28, 2000

Related U.S. Application Data

(63) Continuation-in-part of application No. 09/309,583, filed on May 11, 1999, now abandoned.

(30) Foreign Application Priority Data

Apr. 19, 1999 (AT) .................................................. 258/99 U

(51) Int. Cl.$^7$ ............................................................ F02B 25/06
(52) U.S. Cl. ........................ 123/54.1; 123/54.4; 123/54.5
(58) Field of Search ..................... 123/54.4, 54.5, 123/192.2, 196 R, 55.1, 179.25, 90.27, 90.31, 198 F

(56) References Cited

U.S. PATENT DOCUMENTS

| | | | | |
|---|---|---|---|---|
| 4,156,409 | * | 5/1979 | Nakano | 123/41.65 |
| 4,637,354 | * | 1/1987 | Tominaga et al. | 123/195 R |
| 5,230,311 | * | 7/1993 | Kuhn et al. | 123/192.2 |
| 6,058,901 | * | 5/2000 | Lee | 123/197.1 |

* cited by examiner

*Primary Examiner*—Marguerite McMahon
(74) *Attorney, Agent, or Firm*—Dykema Gossett PLLC

(57) ABSTRACT

This invention relates to an internal combustion engine for a motorcycle, with two or more single cylinders arranged in a plane approximately normal to a crankshaft, each cylinder accommodating a reciprocating piston and the pistons acting via connecting rods on the same crank of the crankshaft supported in a crankcase. To reduce manufacturing expense, the engine is to be provided with modular components for universal use with at least two different cylinder arrangements (V-type, W-type).

39 Claims, 6 Drawing Sheets

INTERNAL COMBUSTION ENGINE FOR A MOTORCYCLE

CROSS REFERENCE TO RELATED APPLICATION

This application is a continuation-in-part of application Ser. No. 09/309,583, filed May 11, 1999, now abandoned.

BACKGROUND OF THE INVENTION

This invention relates to an internal combustion engine for a motorcycle, with two or more single cylinders arranged in a plane approximately normal to a crankshaft, each cylinder accommodating a reciprocating piston and the pistons acting via connecting rods on the same crank of the crankshaft supported in a crankcase.

DESCRIPTION OF THE PRIOR ART

In U.S. Des. Pat. No. 294,264 an internal combustion engine for motorcycles is described which includes two cylinders arranged radially to a crankshaft in V-type fashion, each cylinder acting on a crank via a connecting rod. This type of engine features great compactness and a very short overall length, so that it can be mounted transversely in a motorcycle. For reasons of layout and space the cubic capacity per cylinder is limited. The total cubic capacity could only be increased by adding more cylinders, which would increase the engine's overall length, however.

Another alternative known in the art is the use of three cylinders which are radially positioned relative to the engine crankshaft, where the pistons sliding in the cylinders act on a common crank of the crankshaft by means of individual connecting rods. Such an internal combustion engine whose cylinders are arranged in the shape of a W, is described in U.S. Pat. No. 5,765,451. Engines with W-type cylinder arrangement, where the cylinders are positioned essentially in a plane normal to the crankshaft, will also permit a most compact design with very short overall length. Compared to the V-engine, the additional cylinder will improve the engine's running characteristics and significantly increase its cubic capacity while the small size will be maintained. The large piston-swept volume will permit high engine performance at comparatively low rpm, combined with a typical, full, comparatively low-frequency engine sound.

The different properties of V- and W-engines will appeal to different groups of consumers.

To meet the demand for V-engines on the one hand and W-engines on the other, separate production and distribution systems would have to be set up under conventional conditions, which would require considerable production and logistics efforts and involve high manufacturing costs.

SUMMARY OF THE INVENTION

It is an object of the invention to avoid the above disadvantages and to reduce the manufacturing costs for an internal combustion engine of the afore-mentioned type.

In the invention this object is achieved by using modular components for universal use with at least two different cylinder arrangements. Preferably, the crankcase has a body, which, apart from the flange face for the cylinders, is designed for at least a first and a second cylinder arrangement, the body comprising at least main bearing walls and crankcase side walls. The body may further include a balancer shaft housing configured as an integral part of the crankcase and including balancer shaft bearing walls, and a manual transmission housing including gearshaft bearing walls.

The first cylinder arrangement is formed by at least two cylinders arranged in the shape of a V and the second cylinder arrangement is formed by at least three cylinders arranged in the shape of a W.

Production simplicity and cost-efficiency in manufacturing an internal combustion engine with at least three cylinders in W-type arrangement are considerably improved by providing that at least one component of the group consisting of cylinder head, cylinder, piston, connecting rod, valve train be identical with that of a corresponding engine whose cylinders are arranged in a V.

It is further provided preferably that at least one component of the group consisting of balancer shaft, counterweight, starter, generator, clutch, torque limiter, manual transmission, oil pump, water pump be identical with that of a corresponding engine whose cylinders are arranged in a V. If components of identical type can be used for V- and W-engines, the production process will be simplified considerably, as components may be manufactured and assembled on the same production line. Due to the modular design and component sharing principle large piece numbers will be made possible and manufacturing costs will be reduced. Cost-efficiency will be further improved if at least one component of the group consisting of oil pan, oil cooler, dry sump lubrication, intermediate gear, belt and chain is identical with that of an engine whose cylinders are arranged in a V. Depending on the engine type, carburetor or injection device for multi-point injection or direct injection may be identical in type.

In order to keep production costs for the crankcase down, the proposal is put forward that the body of the crankcase for the W-engine be given the same tooling as that of a corresponding engine with V-type cylinder arrangement. Apart from the cylinder flange the crankcases for both V- and W-engines may be tooled on the same production line.

The large number of shared components has the additional advantage that available production capacities may be fully utilized and downtimes minimized.

V-engines usually have exhaust flange faces that are positioned on the outer side faces of the cylinder heads. To permit the use of identical cylinders and cylinder heads in V-engines and W-engines the proposal is put forward that each cylinder head have a front-side exhaust flange face which is preferably located in a plane normal to the crankshaft axis. The exhaust pipes may thus depart from the front of the engine, which will permit a close spacing of cylinders and reduce the space required by the engine to a minimum.

To permit the use of one and the same crankcase for several engine types, the crankcase features an intermediate gear flange face for connection of an intermediate gear. The intermediate gear, which is configured as a reduction gear, may be designed to be shiftable to enable changing of the reduction ratio.

It may further be provided that the intermediate gear configured as reduction gear be shiftable to enable changing of the reduction ratio, a special advantage being obtained by providing the crankcase with an oil pan flange on its lower side for carrying an oilpan. The oil tank/oil cooler unit forms part of the dry sump lubrication of the engine.

BRIEF DESCRIPTION OF THE DRAWINGS

The invention will now be further described with reference to the accompanying drawings, in which.

In all embodiments identical components bear the same reference numbers. Cylinder arrangements in the shape of a V or W generally bear the references V or W.

DETAILED DESCRIPTION OF PREFERRED EMBODIMENTS

Figure 1:
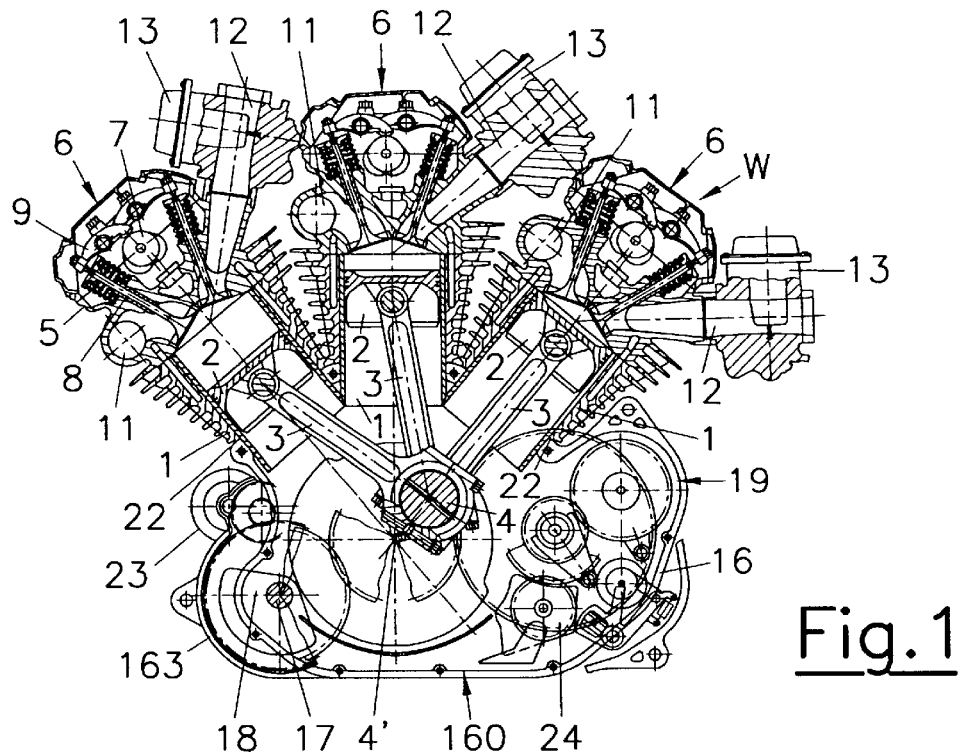
FIG. 1 is a cross-section through an internal combustion engine according to the invention, with W-type cylinder arrangement.
Figure 3:
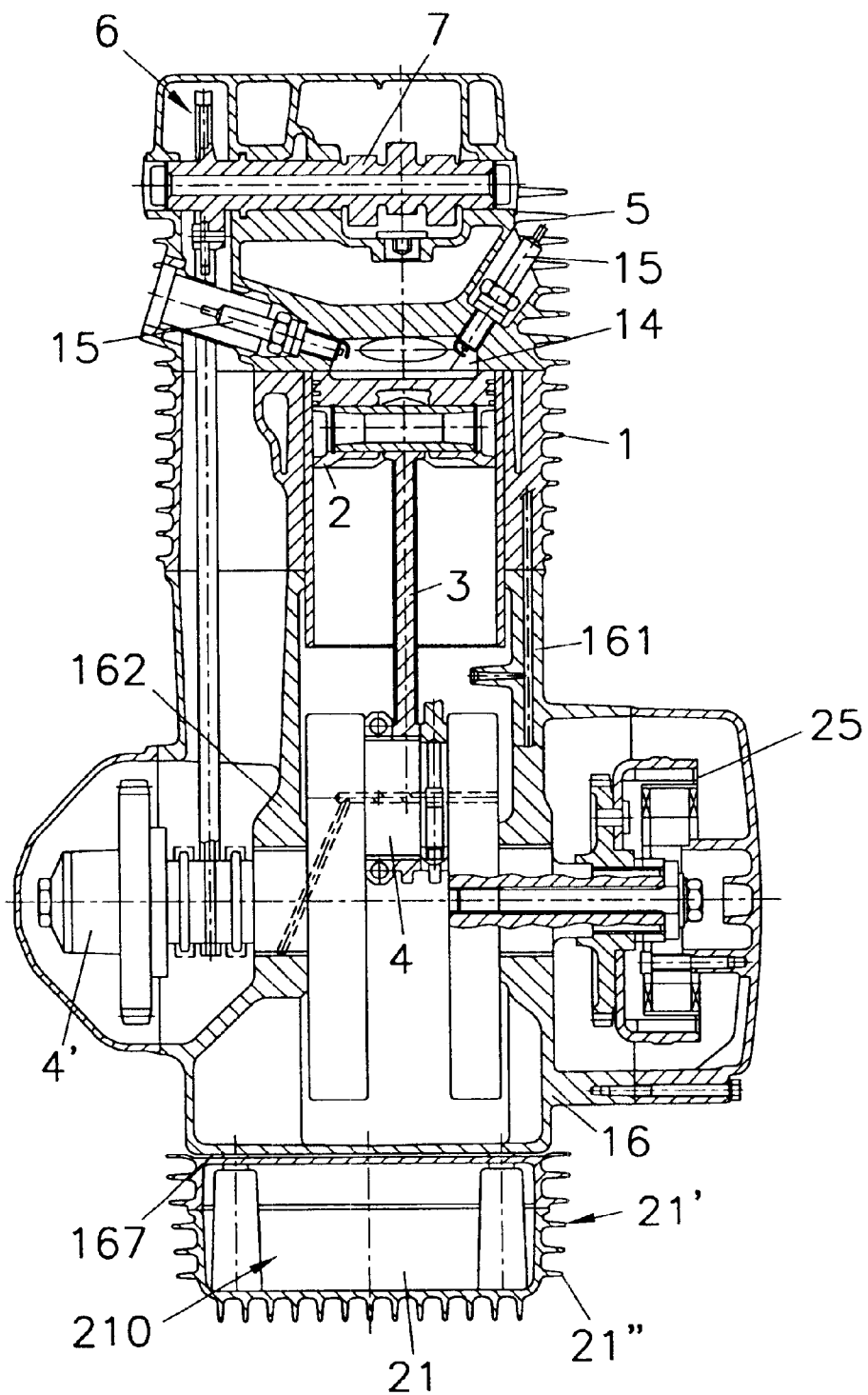
FIG. 3 is a longitudinal section through an internal combustion engine according to the invention, along line III—III in FIG. 5, FIGS. 4 and 5 are views of internal combustion engines according to the invention, in two variants.

FIG. 1 shows an internal combustion engine with W-type arrangement of cylinders 1. Each cylinder 1 accommodates a reciprocating piston 2 which is connected to a crankshaft 4 via a connecting rod 3. Each cylinder 1 carries a cylinder head 5, which is configured as single cylinder head and houses the valve train 6 including camshaft 7, charge exchange valves 8 and rocker arms 9. Each cylinder head 5 has an exhaust flange face 10 on the engine front, which is essentially positioned in a plane normal to the crankshaft axis 4'. The exhaust port leading towards the exhaust flange face 10 bears reference number 11. Each intake pipe 12 is provided with a carburetor 13. The combustion chamber 14 of each cylinder 1 has two spark plugs 15, as is shown in FIG. 3.

The crankshaft 4 is supported in the crankcase 16. The two-part crankcase 16 is divided in a normal plane 29 relative to the crankshaft axis 4'. The crankcase 16 further houses a balancer shaft 17 with counterweight 18. Reference number 19 refers to a manual transmission.

Figure 2:
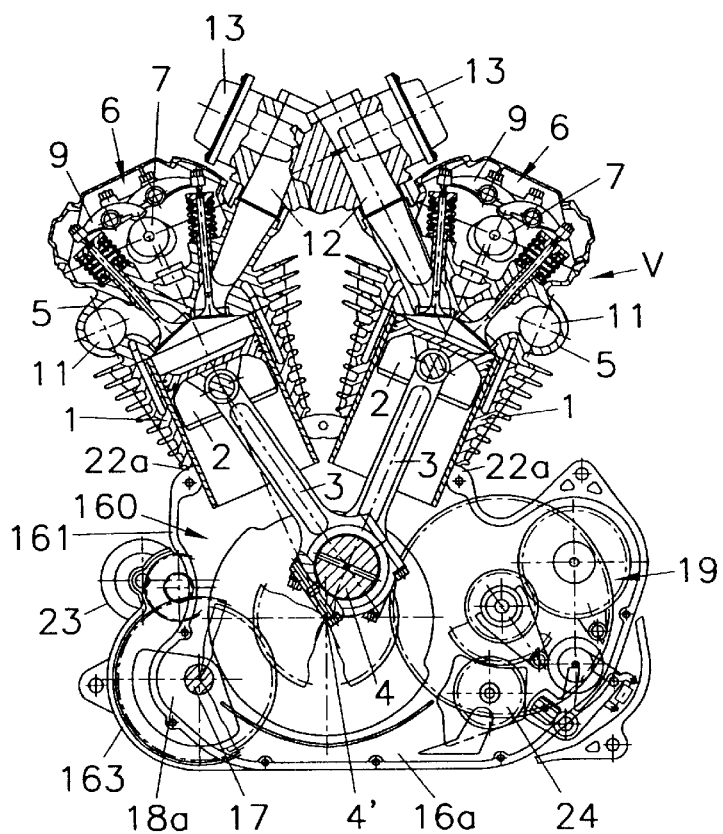
FIG. 2 is a cross-section through an internal combustion engine with V-type cylinder arrangement.

FIG. 2 shows an internal combustion engine with two cylinders 1 arranged in a V. To keep production costs down the W-type engine presented in FIGS. 1 and 3–5 is designed such that components such as cylinder head 5, cylinder 1, piston 2, valve train 6, balancer shaft 17, counterweight 18a, starter 23, generator 25, clutch 27, torque limiter 28, manual transmission 19, oil pump 24, water pump 26 and/or carburetor 13 or injection device are essentially identical with those of the engine shown in FIG. 2 whose cylinders 1 are arranged in a V. In this embodiment oil pump 24 and water pump 26 are located on the same shaft. The above components can thus be manufactured in one and the same production facility.

Moreover, components such as the oil pan 21, oil cooler 21', intermediate gear 20, belt and/or chain may be shared by V-type and W-type engines.

Figure 4:
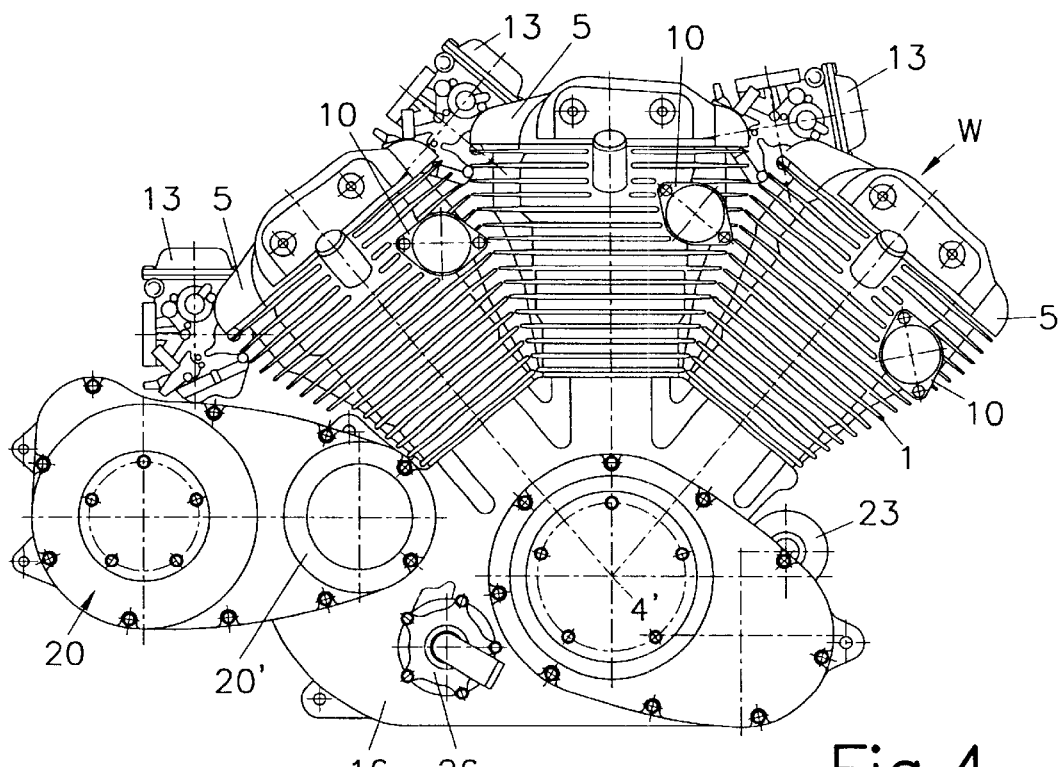
Figure 5:
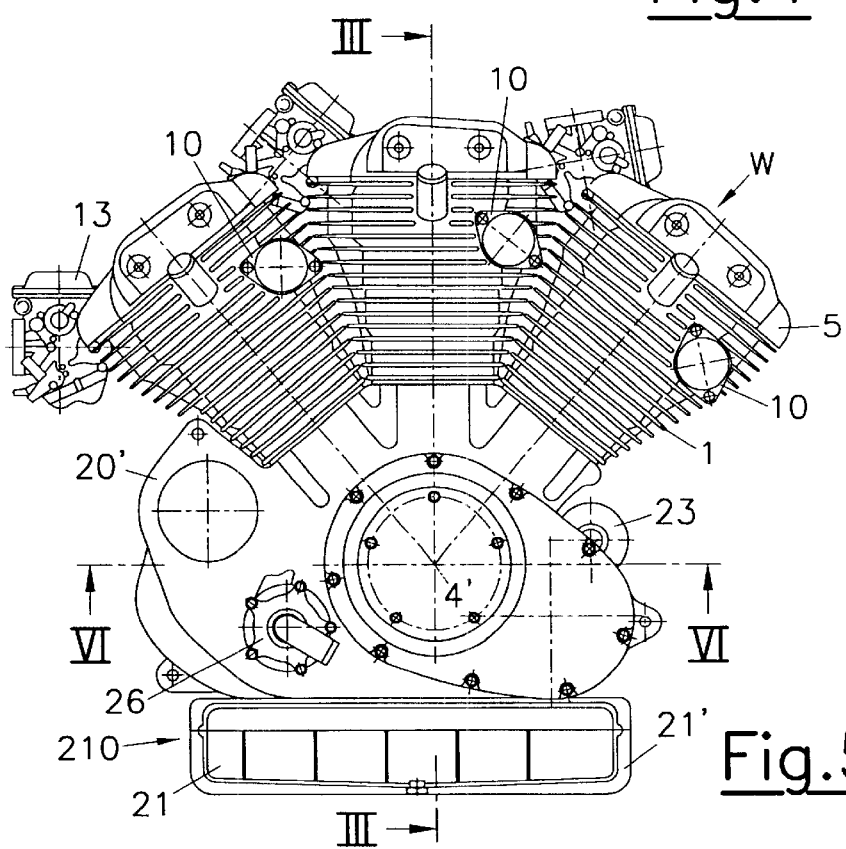
Figure 6:
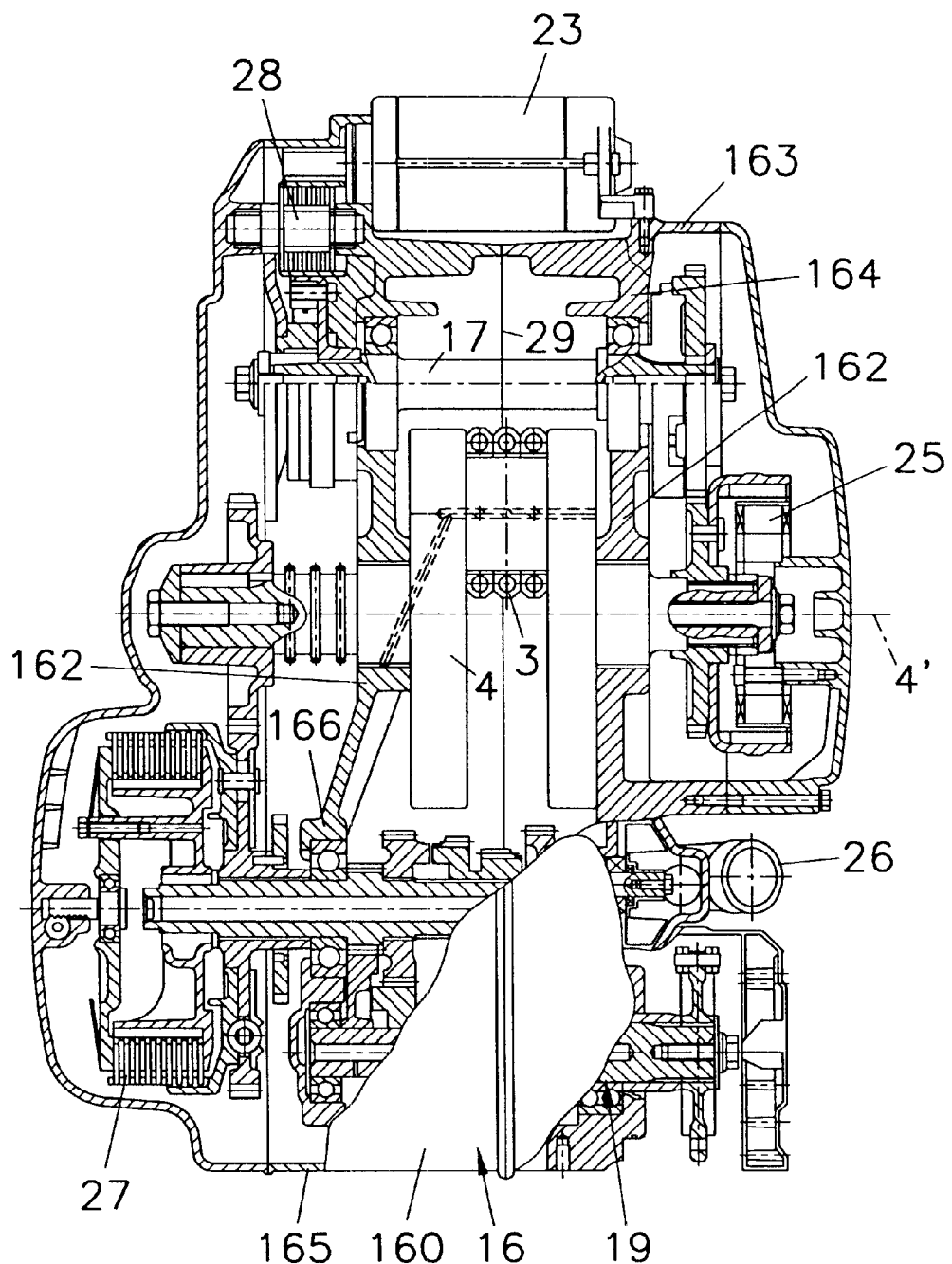
FIG. 6 shows a section of the engine of FIG. 5 along line VI—VI in FIG. 5.

FIG. 4 shows a variant of an internal combustion engine with cylinders 1 arranged in a W, including an intermediate gear 20 configured as a reduction gear. FIG. 5 presents an internal combustion engine with cylinders 1 arranged in a W, where the crankcase 16 is provided with an oil pan flange 167 on its lower side for carrying an oilpan 21 configured as oil tank/oil cooler unit 210. Reference 21" refers to cooling fins of the oil cooler 21'. FIG. 6 presents a section of this engine as seen from below.

The crankcase 16 of the W-engine is designed such that the crankcase body 160, i.e., crankcase 16 except for flange faces 22 for cylinders 1, can be worked with the same tools and tool settings as the crankcase 16a of the engine shown in FIG. 2, whose cylinders 1 are arranged in a V. The corresponding flange face of the V-engine for cylinders 1 is referred to as 22a in FIG. 2.

The crankcase body 160 comprises crankcase side walls 161, main bearing walls 162, balancer shaft housing 163, balancer shaft bearings 164, manual transmission housing 165, gearshaft bearing walls 166.

In the invention the majority of components of both V- and W-engines can be manufactured on the same production line and production efforts and costs can be reduced considerably.

Figure 7:
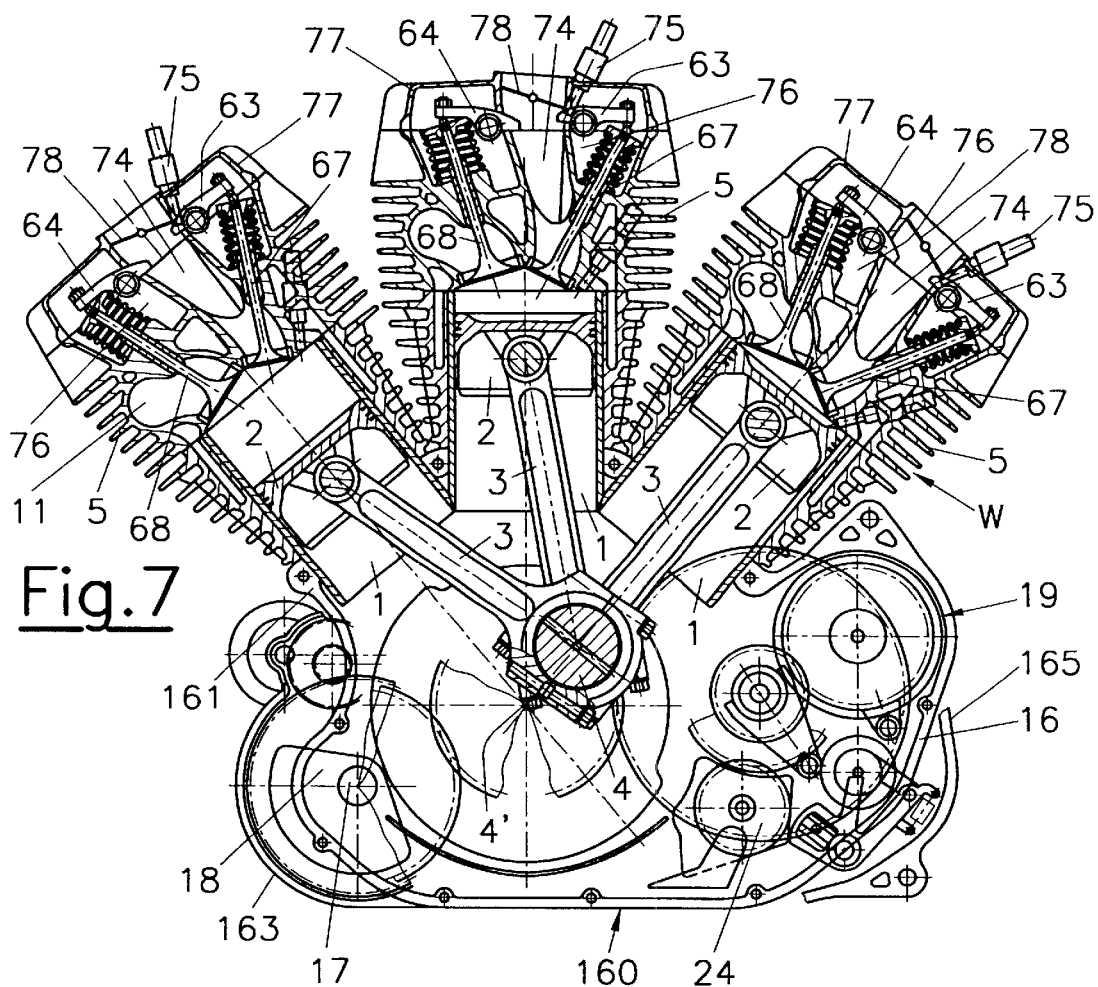
FIG. 7 is a cross-section through an internal combustion engine according to the invention, with W-type cylinder arrangement, in a further embodiment.
Figure 8:
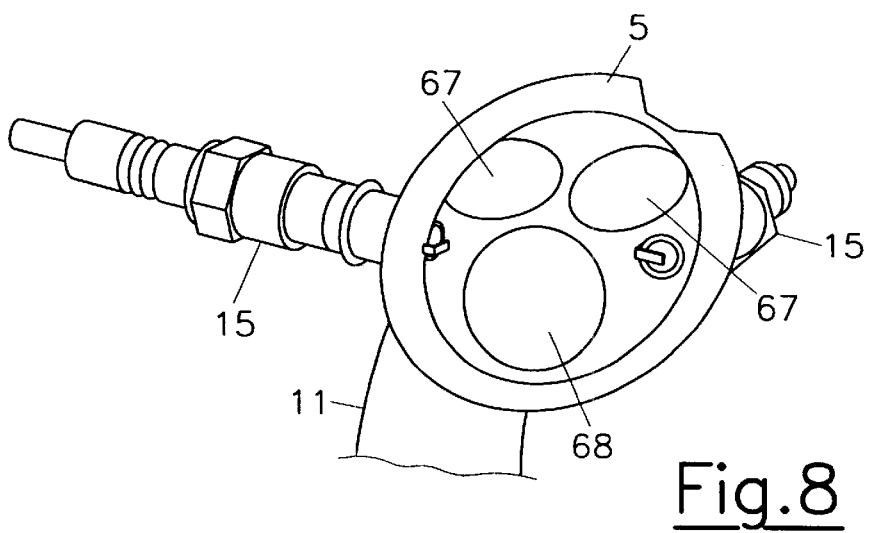
FIG. 8 is an oblique view of the combustion chamber top face in the cylinder head.
Figure 9:
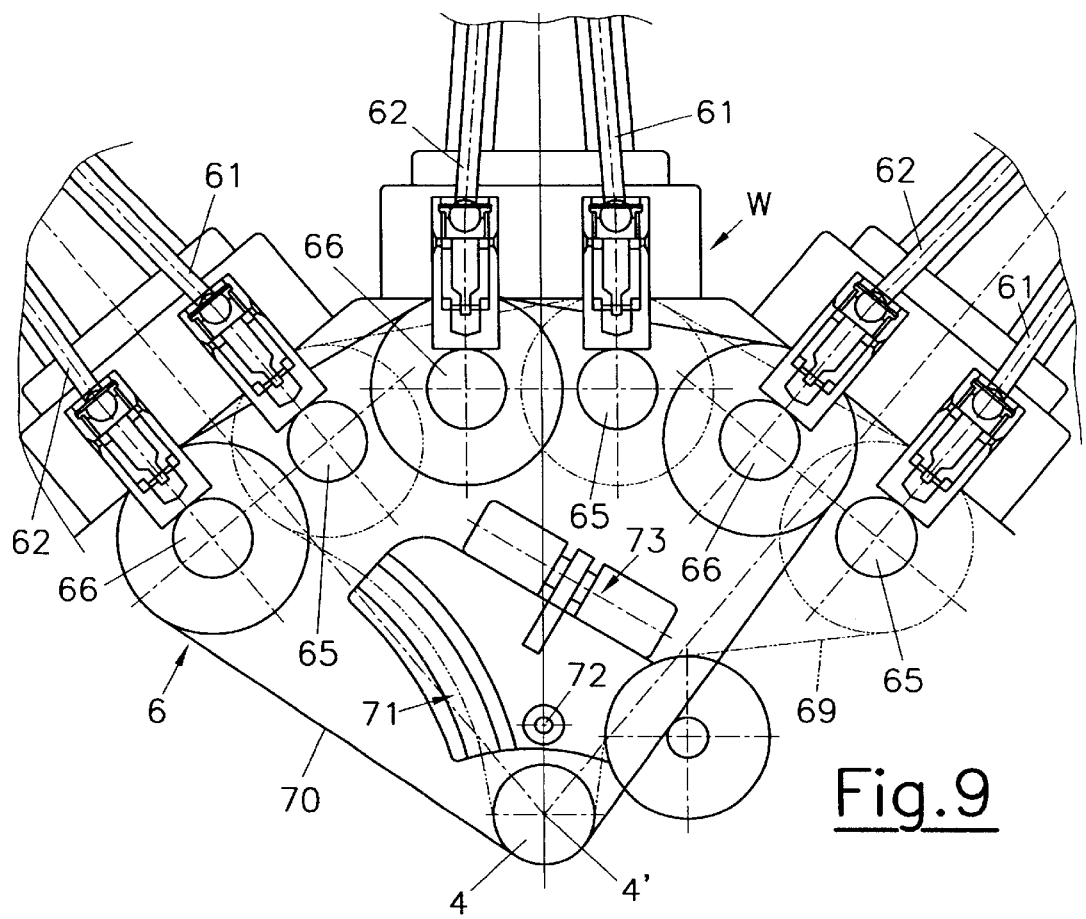
FIG. 9 is a schematical representation of the camshaft drive of this internal combustion engine.
Figure 10:
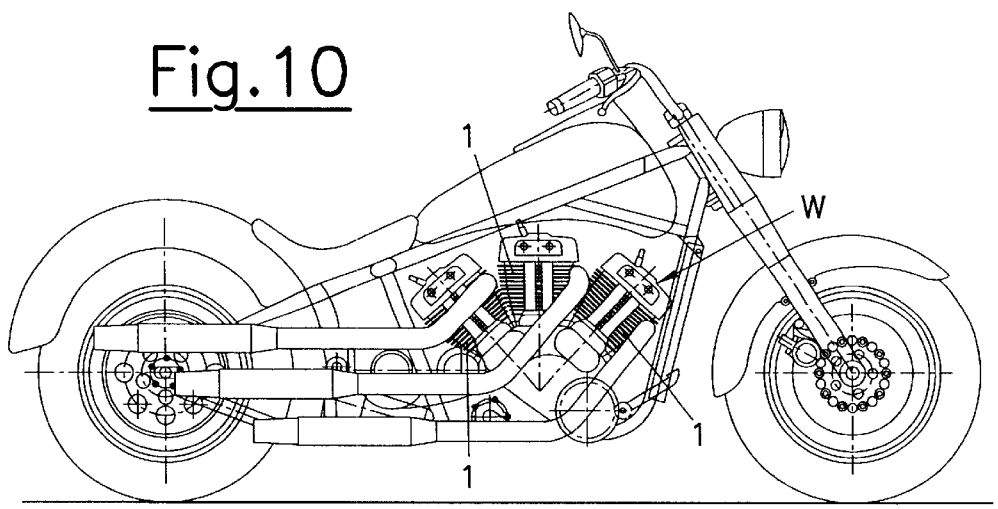
FIG. 10 is a side view of the complete motorcycle.

FIGS. 7 to 9 show another variant of an internal combustion engine with W-type cylinders 1. The intake and exhaust valves of each cylinder 1 are actuated via push rods 61, 62 and rocker arms 63, 64 by means of an intake camshaft 65 and an exhaust camshaft 66 per cylinder 1, as is shown in FIG. 9, each of said camshafts lying below the cylinder. In the engine shown here, with two intake valves 67 and one exhaust valve 68 per cylinder 1, the rocker arm 63 for the intake valves 67 is configured as a forked rocker.

The intake camshafts 65 and exhaust camshafts 66 are driven via a traction means 69, 70, such as a cam chain or belt. At least the means 69 driving the intake camshaft 65 is provided with a pivoted cam chain guide 71. By rotating the cam chain guide 71 about a pivot 72 the timing of the intake valves 67 may be phase-shifted. The rotation is effected by a hydraulically operated actuating device or a solenoid actuator 73.

As is seen in FIG. 7, each cylinder 1 of the internal combustion engine shown is provided with an injection device 75 opening into an intake port 74, which device 75 is positioned in the rocker arm bearing block 76 or the valve cover 77 covering the top of the cylinder head 5.

Integrated into the rocker arm bearing blocks 76 or the valve covers 77 are preferably oval throttle valves 78 of the intake ports 74. In the variant shown in FIG. 7 the intake ports 74 are arranged in the cylinder heads 5 in such a way that reverse tumble flows will be initiated in the combustion chambers.

As is seen in FIG. 8, two spark plugs 15 are provided for each cylinder 1.

This variant is also characterized by the modular design of the internal combustion engine, which means that major components can be used both in engines with V-type and W-type cylinder arrangements.

I claim:

1. An internal combustion engine for a motorcycle, with at least two single cylinders arranged in a plane approximately normal to a crankshaft and the cylindrical axis of each cylinder intersecting the crankshaft axis, each cylinder accommodating a reciprocating piston and the pistons acting via connecting rods on the same crank of the crankshaft supported in a crankcase, wherein the engine is provided with modular components for universal use with at least two different cylinder arrangements, wherein the crankcase has a crankcase body, which, apart from a flange face for the cylinders, is designed for at least a first and a second cylinder arrangement, said body comprising at least main bearing walls and crankcase side walls, and wherein the first cylinder arrangement is formed by at least two cylinders arranged in the shape of a V and the second cylinder arrangement is formed by at least three cylinders arranged in the shape of a W.

2. An internal combustion engine according to claim 1, wherein the crankcase body is provided with a balancer shaft housing including balancer shaft bearing walls.

3. An internal combustion engine according to claim 1, wherein the crankcase body is provided with a manual transmission housing including gear shaft bearing walls.

4. An internal combustion engine according to claim 1, with at least three cylinders in W-type arrangement, wherein at least one component of the group consisting of cylinder head, cylinder, piston, connecting rod, valve train is identical with that of a corresponding engine whose cylinders are arranged in a V.

5. An internal combustion engine according to claim 4, wherein at least one component of the group consisting of balancer shaft, counterweight, starter, generator, clutch, torque limiter, manual transmission, oil pump, water pump is identical with that of a corresponding engine whose cylinders are arranged in a V.

6. An internal combustion engine according to claim 4, wherein at least one component of the group consisting of oil pan, oil cooler, dry sump lubrication, intermediate gear, belt, chain, injection device, carburetor is identical with that of an engine whose cylinders are arranged in a V.

7. An internal combustion engine according to claim 4, wherein the crankcase body is given the same tooling as the crankcase body of a corresponding engine whose cylinders 1 are arranged in a V.

8. An internal combustion engine according to claim 1, wherein each cylinder head has a front-side exhaust flange face.

9. An internal combustion engine according to claim 1, wherein the exhaust flange face is located essentially in a plane normal to the crankshaft axis.

10. An internal combustion engine according to claim 1 with an intermediate gear, wherein the crankcase features an intermediate gear flange face for connection of the intermediate gear.

11. An internal combustion engine according to claim 10, wherein the intermediate gear configured as reduction gear is shiftable to enable changing of a reduction ratio.

12. An internal combustion engine according to claim 1, wherein the crankcase is provided with an oil pan flange on its lower side for carrying an oilpan.

13. An internal combustion engine according to claim 12, wherein the oil pan flanged onto the crankcase has cooling fins on its outside and is configured as oil tank/oil cooler unit.

14. Internal combustion engine according to claim 1, with one cylinder head per cylinder, wherein the cylinder head is provided with at least one exhaust valve and two intake valves, which are actuated via push rods and rocker arms held in a rocker arm bearing block, by means of intake and exhaust camshafts lying below the cylinders, one intake and one exhaust camshaft being provided for each cylinder.

15. Internal combustion engine according to claim 14, wherein at least the two intake valves are actuated via a single push rod, said push rod acting on the intake valves via a rocker arm configured as a forked rocker.

16. Internal combustion engine according to claim 14, wherein the intake camshafts on the one hand and the exhaust camshafts on the other hand are driven from the crankshaft by means of a traction means each.

17. Internal combustion engine according to claim 16, wherein at least the means driving the intake camshafts is provided with a variable cam chain guide, by means of which the timing of the intake valves at least can be phase-shifted relative to the crankshaft.

18. Internal combustion engine according to claim 17, wherein the cam chain guide is rotatably mounted on a pivot and is rotated by means of an actuating device.

19. Internal combustion engine according to claim 1, wherein two spark plugs per cylinder are located in the cylinder head.

20. Internal combustion engine according to claim 14, with at least one throttle valve per cylinder, which is located in an intake port, wherein the throttle valve is held in the rocker arm bearing block.

21. Internal combustion engine according to claim 1, with at least one throttle valve per cylinder and one valve cover covering the cylinder head, wherein the throttle valve is held in the valve cover.

22. Internal combustion engine according to claim 14, with one injection device per cylinder opening into at least one intake port, wherein said injection device is positioned in the rocker arm bearing block.

23. Internal combustion engine according to claim 1, with at least one injection device per cylinder opening into an intake port, wherein said injection device is positioned in the valve cover.

24. Internal combustion engine according to claim 1, wherein at least one injection device per cylinder opens directly into a combustion chamber.

25. Internal combustion engine according to claim 24, wherein an additional injection device per cylinder opens into at least one intake port.

26. Internal combustion engine according to claim 1, wherein two intake ports per cylinder open into the combustion chamber via an intake valve each, and one exhaust port leaves the combustion chamber via an exhaust valve, intake valves and exhaust valves being arranged on opposite sides of a plane defined by a cylinder axis and a crankshaft axis, and the intake ports intersecting said plane and being curved so as to produce a reverse tumble flow in the combustion chamber, which is directed from the intake valves towards the piston and further on towards the exhaust valve.

27. A modular system for an internal combustion engine for a motorcycle, with at least two single cylinders arranged in a plane approximately normal to a crankshaft and the cylindrical axis of each cylinder intersecting the crankshaft axis, each cylinder accommodating a reciprocating piston and the pistons acting via connecting rods on the same crank of the crankshaft supported in a crankcase, wherein the engine is provided with modular components for universal use with at least two different cylinder arrangements, wherein the crankcase has a crankcase body, which, apart from the flange face for the cylinders, is designed for at least a first and a second cylinder arrangement, said body comprising at least main bearing walls and crankcase side walls, and wherein the first cylinder arrangement is formed by at least two cylinders arranged in the shape of a V and the second cylinder arrangement is formed by at least three cylinders arranged in the shape of a W.

28. A modular system according to claim 27, wherein the crankcase body is provided with a balancer shaft housing including balancer shaft bearing walls.

29. A modular system according to claim 27, wherein the body is provided with a manual transmission housing including gear shaft bearing walls.

30. A modular system according to claim 27, with at least three cylinders in W-type arrangement, wherein at least one component of the group consisting of cylinder head, cylinder, piston, connecting rod, valve train is identical with that of a corresponding engine whose cylinders are arranged in a V.

31. A modular system according to claim 30, wherein at least one component of the group consisting of balancer shaft, counterweight, starter, generator, clutch, torque limiter, manual transmission, oil pump, water pump is identical with that of a corresponding engine whose cylinders are arranged in a V.

32. A modular system according to claim 30, wherein at least one component of the group consisting of oil pan, oil cooler, intermediate gear, belt, chain, injection device, carburetor is identical with that of an engine whose cylinders are arranged in a V.

33. A modular system according to claim 30, wherein the crankcase body is given the same tooling as the crankcase body of a corresponding engine whose cylinders are arranged in a V.

34. A modular system according to claim 27, wherein each cylinder head has a front-side exhaust flange face.

35. A modular system according to claim 34, wherein the exaust flange face is located essentially in a plane normal to the crankshaft axis.

36. A modular system according to claim 27, wherein the crankcase features an intermediate gear flange face for connection of the intermediate gear.

37. A modular system according to claim 36, wherein the intermediate gear configured as reduction gear is shiftable to enable changing of the reduction ratio.

38. A modular system according to claim 27, wherein the crankcase is provided with an oil pan flange on its lower side for carrying an oilpan.

39. A modular system according to claim 38, wherein the oil pan flanged onto the crankcase has cooling fins on its outside and is configured as oil tank/oil cooler unit.

* * * * *